United States Patent [19]
Thor

[11] 3,883,061
[45] May 13, 1975

[54] WIRE-FEED APPARATUS
[75] Inventor: Kurt Thor, Bergheide, Germany
[73] Assignee: Veb Mansfled Kombinat Wilhelm Pieck, Eisleben, Germany
[22] Filed: July 11, 1973
[21] Appl. No.: 378,259

[52] U.S. Cl. .................. 226/154; 226/181; 226/192
[51] Int. Cl. ............................................. B65h 17/22
[58] Field of Search ........ 228/33, 41; 226/180, 182, 226/154, 155, 180, 181, 192; 214/338, 339; 219/130, 136

[56] References Cited
UNITED STATES PATENTS

| | | | |
|---|---|---|---|
| 1,733,812 | 10/1929 | MacRae | 214/338 X |
| 1,966,200 | 7/1934 | Eskilson | 228/41 X |
| 3,014,519 | 12/1961 | Wright | 214/338 X |
| 3,684,152 | 8/1972 | Boden | 228/41 |

Primary Examiner—Richard A. Schacher
Attorney, Agent, or Firm—Ernest G. Montague; Karl J. Ross; Herbert Dubno

[57] ABSTRACT

An elongate workpiece, specifically a welding wire, is advanced by alternate engagement with the peripheral edges of a pair of feed rollers inclinedly mounted on a unitary drive shaft. The axes of the feed rollers are skew to each other and to the axis of rotation of the shaft, lying in parallel planes on opposite sides of the latter with opposite angles of inclination relative to that axis of rotation. Each roller is mounted by ball bearings on an associated eccentric shaft segment on which it is thus freely rotatable; upon engagement of its sharp peripheral edge with the wire, the roller stops rotating while the wobbling motion of that edge entrains the wire longitudinally over the surface of a coacting pressure roller.

6 Claims, 3 Drawing Figures

WIRE-FEED APPARATUS

The present invention relates to a wire-feed apparatus which is of compact construction and small dimensions and feeds wire continuously via a plurality of motor driven transport units.

In arc-welding machines it is known to conduct the electrode wire through the feed tube to the nozzle by means of transport units actuated by a controllable electric motor.

In general, the known wire-feed devices are provided with step-down transmissions, such as, for instance, spur, planetary or worm gears. The step-down drives are usually made quite large because of their low efficiency. The size is designed to stabilize the speed of rotation in the event of variations in load due to unexpected strain in the wire guides or in the nozzle.

In order to improve the efficiency of such wire feed devices, it is known to lubricate the wire before entrance into the hollow guide in order to keep the frictional losses within permissible limits.

The disadvantage of the known wire-feed devices resides in the fact that they are poorly suited for transporting the welding wire or rod over a plurality of motor driven units since, on account of their dimensions, it is difficult to install them on a long wire-feeding path. In semiautomatic welding apparatus, where the wire is pulled through a feeder arranged in the handle, there is the disadvantage that, because of the size of the drive means, the handle of the burner will become very heavy and cumbersome.

It is one object of the present invention to provide a wire-feed device which is of simple construction and adjustable within a wide range and in which the step-down drive is done away with and, as a result, the dimensions are reduced and the weight decreased.

It is another object of the present invention to provide a wire-feed device having such dimensions and properties as to enable a feeding of the wire over long distances and under difficult conditions without heavy, space-consuming step-down drives being required.

I realize these objects, pursuant to the present invention, by inclinedly mounting at least one pair of feed rollers on a unitary drive shaft, the axes of the feed rollers being skew to each other and to the axis of rotation of the shaft. By virtue of their opposite inclination with reference to the axis of rotation, and their offsetting in opposite directions from the latter axis, the two rollers intermittently engage with their sharp peripheral edges an elongate workpiece such as a welding wire extending generally parallel to the shaft axis. The wobbling motions of these roller edges, which are 180° out of phase, alternately advance the wire in its longitudinal direction along a supporting surface which may be the surface of a coacting pressure roller. If the feed rollers are carried on respective eccentric shaft segments by low-friction bearing means, they will stop rotating on engaging the wire surface so as not to execute any sliding motion relative thereto; thus, no twist is imparted to the workpiece. Advantageously, these feed rollers are so spaced on the shaft that the point of incipient engagement of the wire with one roller lies close to its point of incipient disengagement from the other roller.

A variation of the speed of advance of the welding wire is possible by a change in the speed of rotation of the drive element and by changing the angle of inclination of the feed rollers on the shaft.

With the elimination of the step-down drive, the frictional losses decrease and the efficiency of the wire feed increases. Furthermore, the dimensions of the wire feed are reduced since the drive elements can be made correspondingly small.

For semiautomatic welding apparatus in which the drive element for the wire-feed is arranged in the handle of the burner, the wire feed device can be arranged in a space-saving manner in the handle of the burner, since the wire guide is located outside the drive shaft directly on the outer shell of the drive element. The burner handle is thereby made lighter and handier.

These and other features of my invention will become apparent from the following detailed description given with reference to the accompanying drawing in which.

Figure 1:
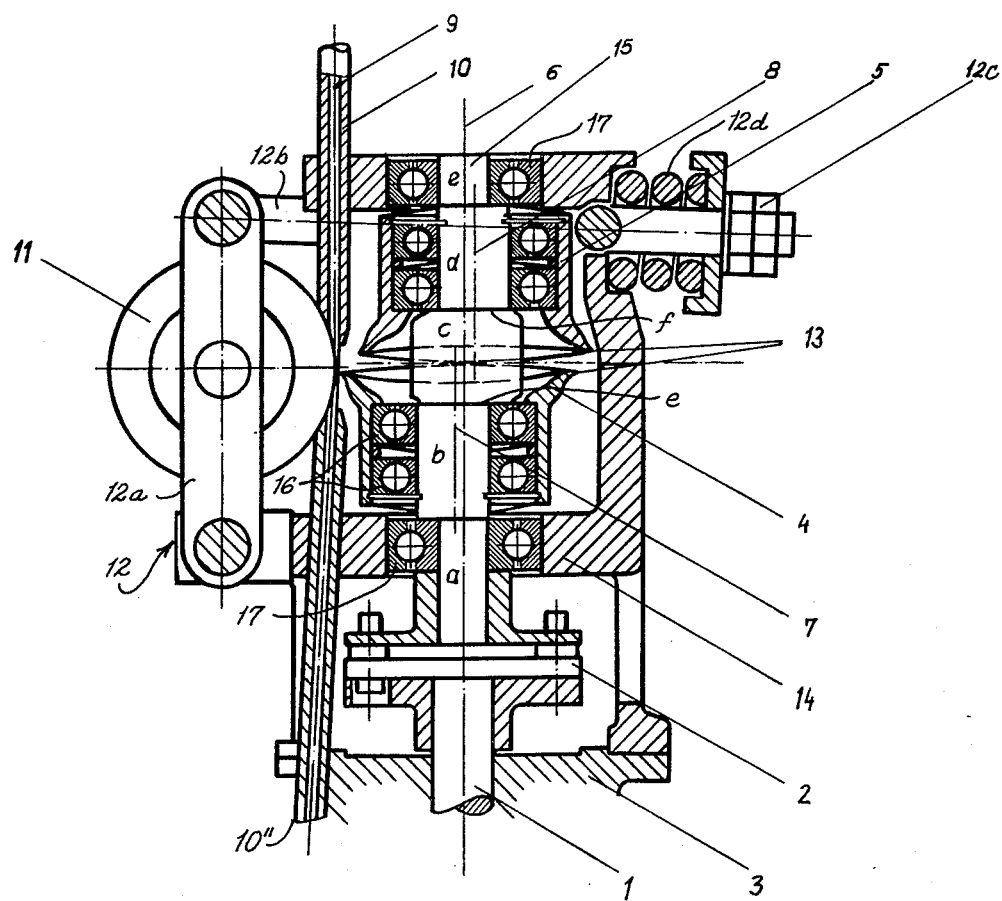
FIG. 1 is a sectional view through a wire-feed device embodying the present invention.

The wire-feed device shown in FIG. 1 comprises a housing 14 firmly connected with a drive motor (not shown).

A unitary shaft 15 is driven by the nonillustrated motor via a stub shaft 1 and a clutch 2. A pair of feed rollers 4 and 5 are inclinedly mounted on the shaft 15 so that, upon rotation of the shaft 15, their peripheral edges 13 describe wobbling motions 180° out of phase. These edges 13 are sharpened to bite into the surface of a workpiece to be advanced, i.e., a welding wire 9.

Figure 3:
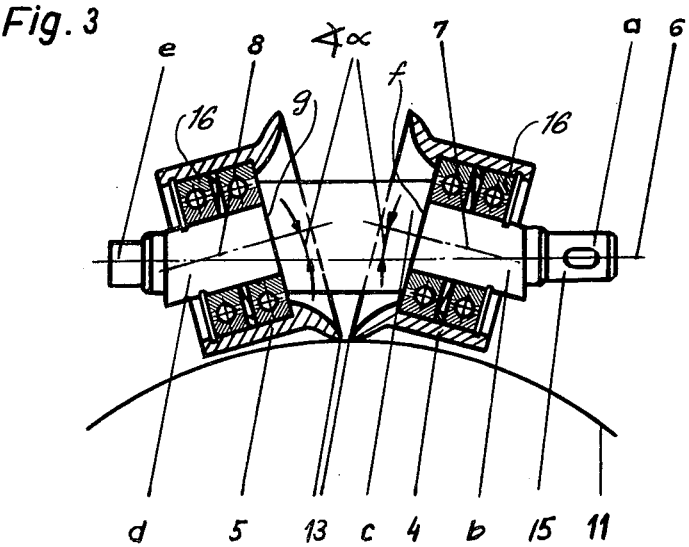
FIG. 3 is an axial sectional view of the feed rollers taken on the line III—III of FIG. 2.

The shaft 15 consists of five integral segments $a$, $b$, $c$, $d$, $e$ of different diameters, the axes 7 and 8 of the segments $b$ and $d$ being inclined at an acute angle $\alpha$ to the central axis 6 of the shaft 15 (i.e., to its axis of rotation) as best seen in FIG. 3.

The feed rollers 4 and 5 are supported by ball bearings 16 on the inclined segments $b$ and $d$. The coaxial shaft extremities $a$ and $e$ are journaled in housing 14 with the aid of ball bearings 17.

Figure 2:
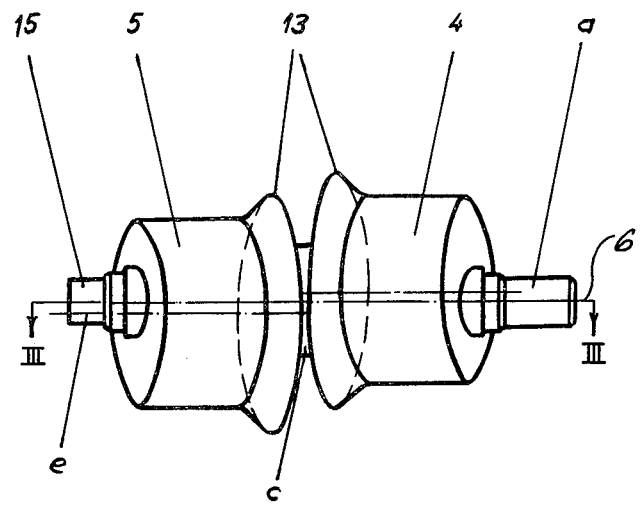
FIG. 2 is an elevational view of the feed rollers on the drive shaft of the device.

Segments $b$ and $d$ eccentrically adjoin two inclined end faces $f$, $g$ of middle segment $c$ defining the sides of an isosceles trapezoid in the axial plane seen in FIG. 3. As is apparent from FIGS. 1 and 2, the axes 7 and 8 of segments $b$ and $d$ and therefore of rollers 4 and 5) are offset from the central axis 6, lying on opposite sides thereof in planes that are perpendicular to the faces $f$ and $g$. By virtue of this arrangement, the two roller edges 13 alternately approach the surface of a pressure roller 11 hugged by the wire 9; in the position of FIG. 3, one of these edges (e.g., that of feed roller 4) is about to engage the wire while the other edge (e.g., that of feed roller 5) detaches itself therefrom. The wobbling motion of the engaging roller edge pulls the wire in one direction (e.g., from left to right in FIG. 3) over pressure roller 11, this being the same direction as that in which the wire was previously transported by the other roller up to its point of disengagement. Since the ball bearings 16 enable the feed rollers 4 and 5 to rotate freely on their respective shaft segments, they will not be rotationally entrained by the shaft 15 during engagement with the wire and will therefore execute no sliding motion relative to that wire.

Pressure roller 11, lying in a plane that contains the axis of rotation 6, is mounted on a frame 12 which includes a swingable arm 12a and a link 12b, the latter being engaged by nuts 12c under pressure of a coil spring 12d urging the roller 11 against the wire 9 as the latter emerges from a feed tube 10' and enters another feed tube 10''. The rate of advance of the wire 9 can be adjusted by varying the motor speed and depends also on the angle of inclination $\alpha$ of relatively skew segment axes 7 and 8 (or, more precisely, of the projections of these axes upon the axial plane of FIG. 3) with reference to the axis of rotation 6.

While I have disclosed one embodiment of the present invention, it is to be understood that this embodiment is given by way of example only and not in a limiting sense.

I claim:

1. An apparatus for longitudinally advancing an elongate workpiece, comprising:
   supporting means for said workpiece;
   a unitary shaft adjacent said supporting means;
   drive means coupled with said shaft for rotating same; and
   a pair of feed rollers mounted on said shaft with opposite angles of inclination relative to the axis of rotation thereof, said feed rollers being centered on roller axes skew to each other and to said axis of rotation on opposite sides of the latter, said feed rollers being provided with sharp peripheral edges executing wobbling motions 180° out of phase upon rotation of said shaft, said feed rollers being disposed close enough to said supporting means to come into intermittent contact with said workpiece for alternately entraining same in a predetermined direction.

2. An apparatus as defined in claim 1 wherein said shaft is provided with a pair of eccentric segments offset from each other, said feed rollers being respectively mounted on said eccentric segments.

3. An apparatus as defined in claim 2, further comprising low-friction bearing means supporting said feed rollers on said eccentric segments for enabling rotary stopping of said feed rollers upon engagement thereof with said workpiece.

4. An apparatus as defined in claim 2 wherein said shaft is further provided with an intermediate segment between said eccentric segments, said intermediate segment having a trapezoidal profile in an axial plane parallel to said roller axes.

5. An apparatus as defined in claim 1 wherein the peripheral edges of said feed rollers closely approach each other in a position of incipient engagement of said workpiece by one of said edges and incipient disengagement of said workpiece by the other of said edges.

6. An apparatus as defined in claim 1 wherein said supporting means comprises a pressure roller in a plane which includes said axis of rotation.

* * * * *